United States Patent Office 3,334,694
Patented Aug. 8, 1967

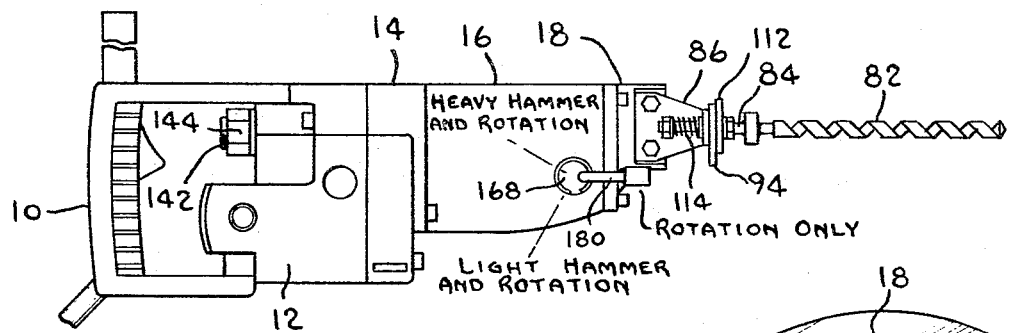
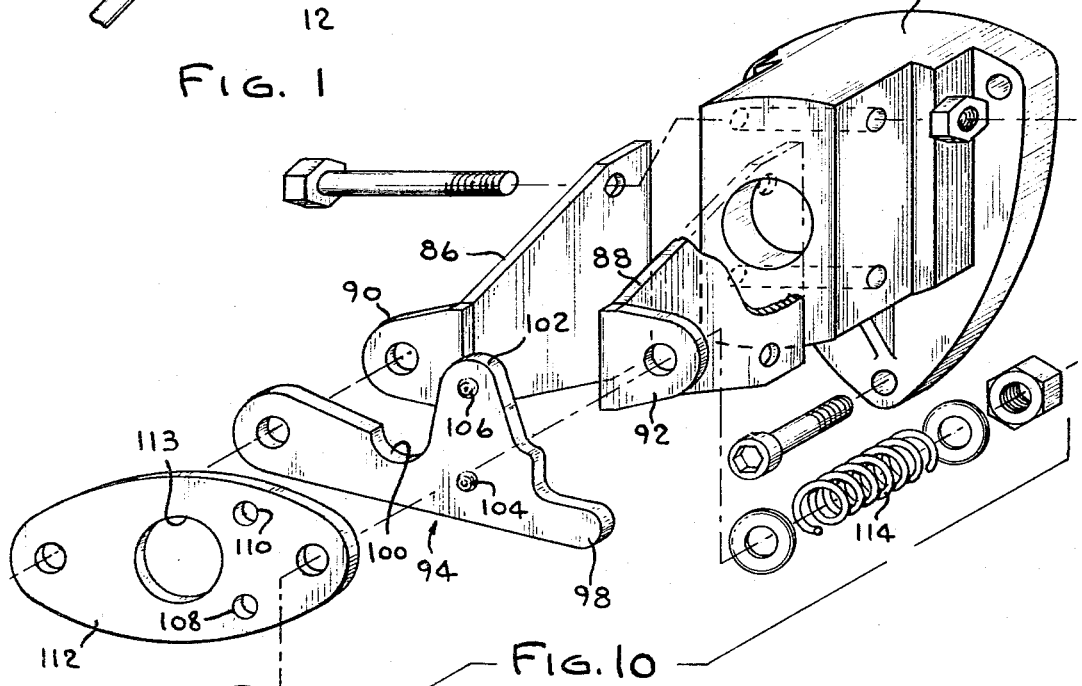
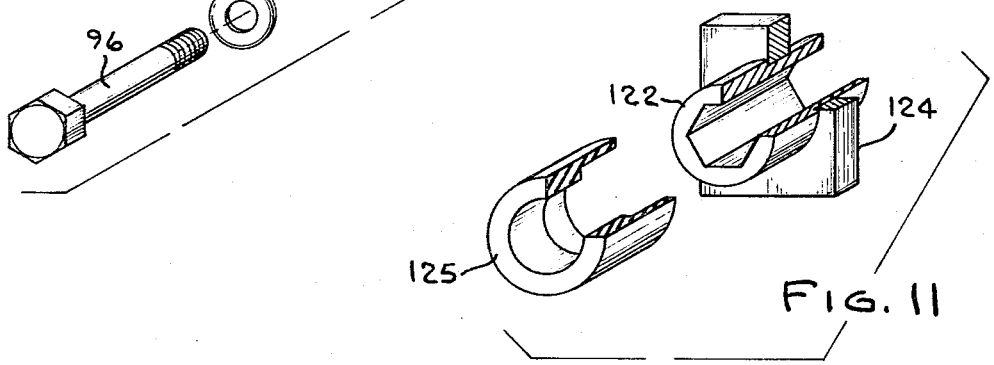

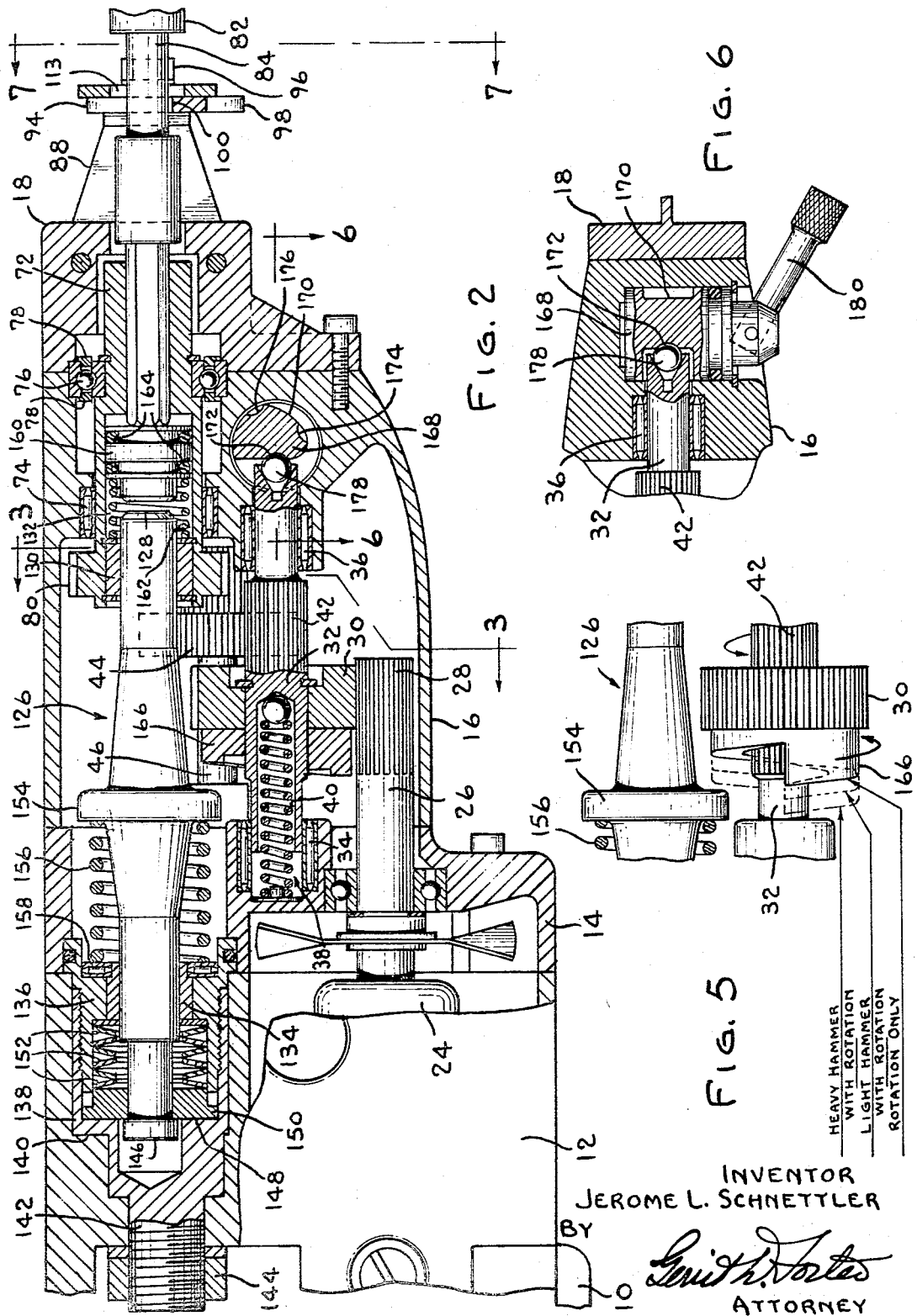

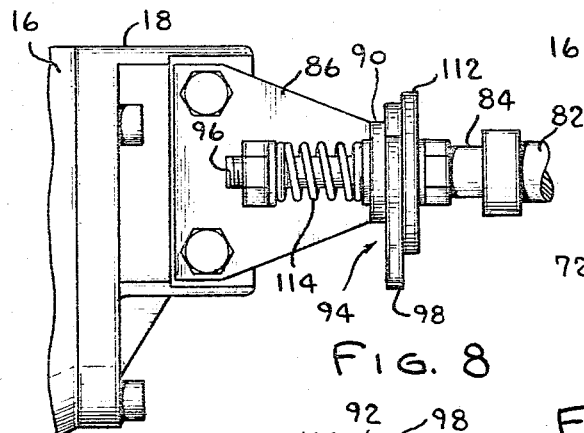
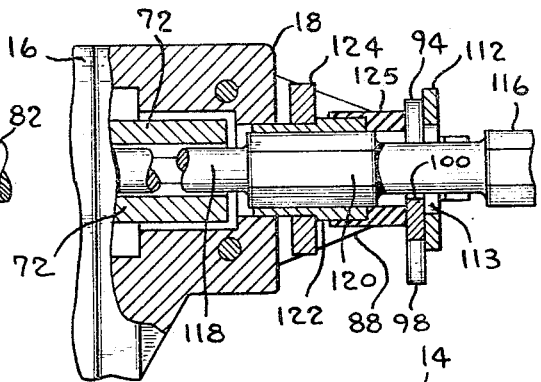
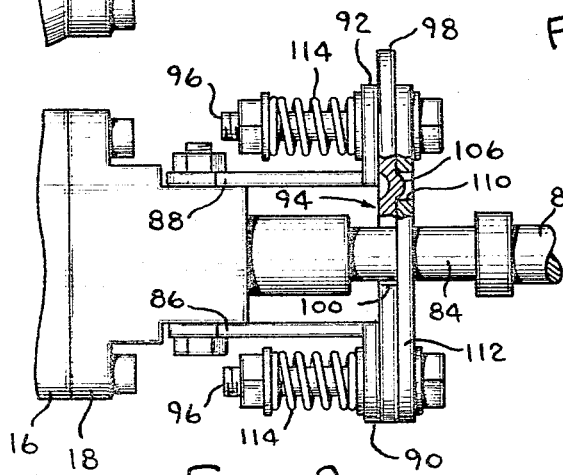
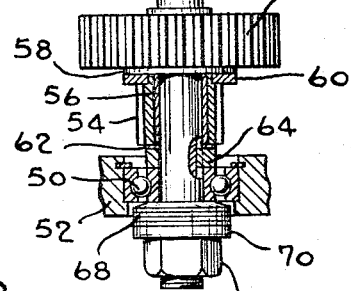
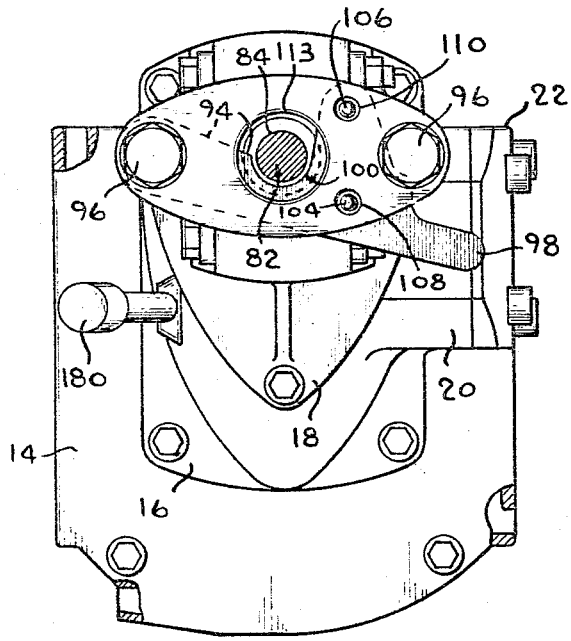
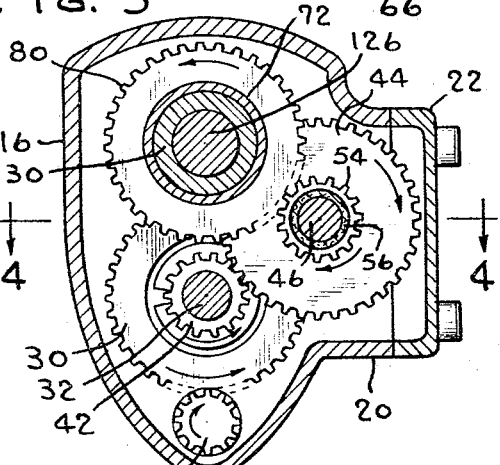

3,334,694
ROTARY HAMMER
Jerome L. Schnettler, Milwaukee, Wis., assignor to Milwaukee Electric Tool Corporation, Milwaukee, Wis., a corporation of Wisconsin
Filed Jan. 12, 1965, Ser. No. 424,966
16 Claims. (Cl. 173—109)

This invention relates to a portable electrically driven tool, particularly a rotary hammer, which is designed to provide variable hammering with rotation, variable hammering only or rotation only.

The object of this invention is to provide such a tool which drills faster, requires a minimum of maintenance, prevents twisting jolts, excessive wear on bit shanks and nose bushing, is relatively inexpensive to manufacture, and is easily handled and used in a variety of positions.

This object is obtained by providing a tool of this type which has an electric driving motor, the axis of which is parallel with, and offset from, the axis of a rotatable spindle gear assembly. The shaft of such motor is formed with elongated driving teeth which mesh with a 1st intermediate gear fixedly mounted on a cam shaft which is mounted for axial movement. Such cam shaft is provided with elongated driving teeth which mesh with a second intermediate gear mounted on a clutch shaft. This second intermediate gear through a friction drive rotates a clutch pinion. This latter pinion meshes with the spindle gear assembly. A spring-biased and spring-buffered ram is aligned with, and movable axially of, the axis of such spindle gear assembly. Such ram is cocked and released by a cam fixed on the cam shaft to provide the hammering action. An eccentric member and handle adjust the cam shaft axially so that the cam will not contact the ram when rotation with no hammering is required or will cock it against its spring in variable amounts and release it to provide light to heavy hammering. There is an impact block carried within the spindle gear assembly and a spring urges it into engagement with the shank end of a bit or other tool fitted in such assembly. This block is provided with sealing means to keep dust and other fine abrasive particles from lodging between the end of the ram and the impact block. While the spindle gear assembly always rotates in the operation of the tool a cylindrical shank tool such as a chisel held therein will not rotate when only hammering is required. However, to make sure of no rotation of the tool, there is provided a tool retaining member within which is temporarily mounted an adapter designed to permit axial movement while preventing rotation.

The cam and spring-biased and buffered operating ram provide more rapid reciprocation and far outwears the semi-pneumatic piston type of hammer. The variable adjustment by the eccentric member provides infinitesimal degrees of hammering force. The offsetting of the cam shaft from the axis of the motor drive shaft and the relative axial movement between driving teeth on such shaft and the 1st intermediate gear prevents any impact force from being transmitted to the motor and its bearings. When rotating the bit, twist jolts due to catching of the bit will be absorbed by the friction slip clutch and avoid injury to the operator.

The characteristics and applications of this invention may be best understood by the following description of a specific embodiment when read in connection with the accompanying drawings, in which:

FIG. 1 is a view in side elevation of a rotary hammer embodying the present invention;

FIG. 2 is a view in a longitudinal vertical section taken through the center of the nose end of the rotary hammer shown in FIG. 1;

FIG. 3 is a fragmentary sectional view taken on the line 3—3 of FIG. 2 showing the gear train arrangement;

FIG. 4 is a fragmentary sectional view taken on the line 4—4 of FIG. 3 and showing in detail the friction drive mechanism;

FIG. 5 is a fragmentary view in top elevation of part of the ram and adjustable cam shown in FIG. 2, with different adjusted positions shown by the broken lines;

FIG. 6 is a fragmentary sectional view taken on the line 6—6 of FIG. 2 showing the eccentric cam adjusting device;

FIG. 7 is a right end view of FIG. 2 taken from the line 7—7 of such figure;

FIG. 8 in a fragmentary enlarged view in side elevation of the nose end of the rotary hammer showing the details of the tool retainer;

FIG. 9 is an enlarged fragmentary view in top elevation of the tool retainer shown in FIG. 8;

FIG. 10 is an exploded perspective view of the nose end section of the rotary hammer and the tool retainer;

FIG. 11 is an exploded perspective view of the adapter and cushion assembly for preventing rotation of a tool when desired; and FIG. 12 is a fragmentary view partially in section through the nose of the hammer of FIG. 2 showing the adapter and cushion assembly in place to prevent rotation of a chisel operated by the hammer.

Referring to the drawings by reference numerals, the portable rotary hammer there shown includes a sectioned housing consisting of the following sections: handle 10; motor enclosure 12; connector 14; a gear train and ram mechanism enclosure 16; and a nose 18; all of which are held together by fasteners in an orthodox manner. The enclosure 16, as shown in FIG. 3 has an offset open side 20 enclosed by a cover 22 to provide operating space for the second intermediate gear laterally offset from the central longitudinal plane of the housing.

Power for all operations is supplied by a conventional electric motor 24 controlled by the usual trigger type switch carried in the handle section. The shaft 26 of such motor projects into the lower central part of the enclosure 16. Its end has an elongated tooth section which constitutes the driving gear 28.

Rotative power from such driving gear is supplied to a first intermediate gear 30 fixedly carried on a shaft 32 mounted in a bearing 34 in the connector section 14 and a bearing 36 in the enclosure 16. This shaft, positioned in the central longitudinal plane of the rotary hammer above the shaft 36, has axial movement relative to said bearings and is biased toward the nose end by a compression spring and ball bearing assembly 38 positioned in a bored recess 40 in the inner end of such shaft. The purpose of such axial movement is to control the hammering action as will be hereinafter described in detail. The shaft 32 is formed with elongated teeth constituting a driving pinion 42 by which rotative power from the shaft 32 is transmitted to a second intermediate gear 44 which is fixedly carried on a clutch shaft 46. As best shown in FIG. 4, such shaft is supported in a bearing 48 carried by the connector section 14 and a bearing 50 carried by a pad 52 formed on the interior of the enclosure section 16. This shaft is offset laterally from the central vertical plane of the hammer as shown in FIG. 3 and is accessible from the outside when the cover 22 is removed.

The rotative power supplied to the second intermediate gear 44 is transmitted to a clutch pinion 54 by an adjustable friction drive so that if a rotating bit or other rotated tool jams or momentarily locks in the work the jolt transmitted back to the hammer housing and its handles will be mostly dissipated by such friction drive and prevent any sudden twisting of the rotary hammer dangerous to the user. This friction drive, as shown in detail in FIG. 4, consists of mounting the clutch pinion 54 on a bushing 56 so that free relative rotation may take place between it and the clutch shaft 46. Compressive force is transmitted from the side of gear 44 to the pinion 54 through a friction washer 58 and a plain washer 60 resting against the end of the pinion to a second friction washer 62 bearing against the other end of the pinion and thence to a thrust washer 64 keyed to the shaft 46 and resting against the bearing 50. The amount of such compressive force is determined by an adjustable lock nut 66 threaded on the end of shaft 46 and four disc springs 68 and a plain washer 70 which react between such bearing and nut. By tightening the nut 66 the springs are loaded and urge the shaft 46 and gear 44 toward the bearing 50 to set up the frictional drive between the gear 44 and washer 64. The nut 66 is accessible for adjustment when the cover 22 is removed.

The rotative power furnished by the clutch pinion 54 is transferred to a tool receiving spindle 72 carried by a bearing 74 mounted in the enclosure section 16 and a bearing 76 mounted between such section and the nose section 18. This bearing is provided with rubber seals 78 to prevent dirt and dust from entering through the open end of the nose 18 around the outside of spindle 72 into the interior of section 16. Such spindle is positioned in the central longitudinal vertical plane of the rotary hammer above the shaft 32 and has formed on it a driven gear 80 meshing with the pinion 54 as shown in FIG. 3. The forward end of the spindle 72 projects into the nose section 18 and has a central opening of hexagonal cross-section aligned with the opening in the nose into which the hexagonal shank of a tool, such as the bit 82, is fitted to provide rotation thereof while permitting relative limited axial movement for the reciprocating hammering action hereinafter described. Tools of this kind are supplied with a reduced diameter portion 84 which provides opposing shoulders which are engaged by a tool retainer to keep the tool in operative relation within the spindle during both operation and handling.

One of the novel features of this invention is the rugged and easily operable tool retainer shown in detail in FIGS. 7 to 10 inclusive. It consists of two oppositely related brackets 86, 88 each provided with laterally extending flanges 90, 92 provided with bolt-receiving openings as shown. These brackets are fixedly secured to the sides of the nose 18 by bolts and nuts or other well-known fastening means. When positioned as shown, the inner sides of such brackets provide abutments for an adapter and cushion assembly as hereinafter described and the outer faces of the flanges 90, 92 provide a bearing for a tool-retaining latch 94. This latch is shaped as shown in FIGS. 9 and 10 and has one end pierced and pivoted on one of two bolts 96 mounted in the openings of flanges 90 and 92. The free end of such latch has a projecting finger 98 by which the latch may be readily swung about its pivot. The central part of the latch is provided with a semicircular notch 100 of a diameter sufficient to loosely receive the reduced portion 84 of the tool and abut against the shoulders formed thereby to keep the tool in place. The latch 94 also has a projection 102 provided with spaced dimples 104 and 106 which hold the latch in open or closed position by cooperating with similarly spaced holes 108 and 110 in a bearing plate 112. This plate is provided with a tool-receiving opening 113 and mounted on the bolts 96 and is biased toward the outer side of the latch 94 by compression springs 114 on such bolts acting between nuts thereon and the flanges 90 and 92 to assist in supporting and guiding it. In FIGS. 7, 8 and 9 the latch is shown in closed position to retain the tool in the spindle. When the finger 98 is pressed downwardly, as viewed in FIG. 7 the nipples 104 and 106 will be forced out of holes 108 and 110 and when nipple 106 seats in hole 108 the latch will be resiliently held in fully open position to permit insertion or withdrawal of a tool. The retainer thus constructed will resist wear and breakage much better than the orthodox spring clip type of retainers and can be opened and closed with greater ease.

Another advantage of the retainer thus described is the easy manner in which an adapter assembly can be added when tools such as the chisel 116 (see FIG. 12) are used without rotation thereof. Tools of this nature are provided with a cylindrical end 118 on the shank which fits within hexagonal opening in the spindle 72 to be guided therein without imparting rotation from the spindle to the tool. Such a tool is also provided with a hexagonal portion 120 between the cylindrical end 118 and the reduced diameter portion 122 which functions the same as the reduced diameter portion 84 of the bit 82. The hexagonal portion will be positioned between the brackets 86 and 88 when the tool is in proper position in the spindle. To prevent rotation of such a tool there is provided an adapter and cushion assembly as shown in FIG. 11. This consists of a cylindrical body 122 provided with a hexagonal opening therethrough which receives the hexagonal portion 120 to prevent relative rotation and provide for relative axial movement. This body has fixed to it a block 124 which fits between the flanges 86 and 88 and abuts them to prevent rotation of the adapter when installed. As part of the rotation preventer assembly there is provided a cushion 125 in the form of a rubber sleeve which fits between the end of the cylindrical body 122 and the inner surface of the latch 94 to hold such body with its inner end fitting in the entrance opening in the nose 18 thereby obtaining alignment with the spindle 72 for easy installation of the tool. This cushion also functions to absorb axial shock imparted to the adapter assembly during hammering action.

Another important feature of this invention resides in the manner in which the hammering action is imparted with variable selectable force to the end of the tool held in the spindle 72 without undue wear of the parts. As shown in FIGS. 2, 5 and 6 the hammering action is supplied by a ram 126 which has a forward striking end 128 slidably and rotatably carried in a plain bearing 130 mounted within an enlarged recess 132 in the inner end of the spindle 72. Thus the bearing 74 for such spindle acting through the bearing 130 properly aligns the striking end of such ram. This construction also permits the easy withdrawal of the ram without disturbing the gear assembly. The rear end of such ram is rotatably and slidably carried in a plain bearing 134 fitted in a plug 136 threadedly secured to a carrier 138. This carrier fits in a noncencentric counter-bored opening 140 in the forward face of the motor enclosure section 12 and has a rearwardly projecting threaded shank 142 which extends through an opening in such section to the exterior thereof where it is removably held by a nut and washer unit 144. The forward end of the plug 136 is slightly enlarged to carry an O-ring in sealing engagement with connector section 14. By disconnecting the motor enclosing section 12 from the connector section 14, the ram 126 and carrier 138 are removable from the rotary hammer upon taking off nut 144. This permits for ready replacement of these parts and is an advantageous part of this invention.

The end of the ram which projects into the carrier 138 has a reduced section provided with a head 146. On this reduced section is slidably mounted a circular abutment 148 provided with a flange 150 spaced from, and adapted to, engage the inner end of the plug 136 to limit the forward movement of the ram. Positioned within a recess within the plug 136 are six spring washers 152 which react between the head 146 through abutment 148 and a washer seated on the inner end of the recess to act as a buffer for the ram in its forward motion.

Located centrally of the ram is an annular flange 154. A strong compression spring 156 reacts between the rearward face of such flange and a needle type thrust bearing 158 to urge the ram in a forward impacting direction. Thus the ram is centered in a null position by the spring 156 and spring washers 152. However, the ram may be moved or cocked rearwardly without any compression of such washers.

In the null position of the ram it is slightly spaced from an impact block 160 slidably mounted in the enlarged recess 132 in the spindle between the outer end of the ram and the bottom of such recess or the inner end of a tool locked in the spindle. A compression spring 162 reacts between such block and the bearing 130 to normally maintain such spacing between the ram and the block except for momentary contact at impact. The block 160 is provided with a pair of O-rings 164 seated in annular grooves to form a seal preventing dust and dirt from entering the interior of the motor housing section 16 through a hexagonal opening in the spindle. This seal, together with the seals 78, block the entry of abrasive materials into moving parts of the rotating ram.

The ram 126 is cocked and released for impact by the rotation of a crown-type cam 166 formed on the 1st intermediate gear 30. As shown in FIG. 5 the axially facing cam surface is in overlapping relationship with the flange 154 of such ram. When the shaft 32 is positioned as shown in the full lines of FIGS. 2 and 5 the spindle 72 will be driven but no hammering action will result because the cam is maintained out of contact with such flange by the spring 38 urging such shaft axially to its farthest outer position. However, when the shaft 32 is moved axially inwardly against the pressure of such spring the cam in its rotation will engage the flange and cock the ram 126, compressing spring 156 until the peak of the cam moves out of engagement with it. At this instant the spring 156 will rapidly advance the ram to provide the hammering impact as previously described. The impact stroke is rapid enough to be completed before the advancing lower surface of the cam engages the flange, thus no impact force is applied to the cam and its shaft and all such force is directed to the impact block and tool.

In order to place and hold the cam in the non-hammer position or either of the two hammering positions shown in the broken lines of FIG. 5 there is provided a hand-controlled eccentric mechanism which consists of a cylindrical body 168 mounted in a circular recess in the section 16 so that its axis of rotation is perpendicular to, but lying in, the extension of the axis of the shaft 32. This body is formed to provide an eccentric surface 170 shaped as shown in FIGS. 2 and 6. The low or non-hammering portion of such surface has a ball seat 172, the next highest or light hammer portion of such surface has a ball seat 174, and the highest or heavy hammering portion of such surface has a ball seat 176. When the body 168 is rotated in a clockwise direction from the position shown in FIG. 2, the ball seats 174 and 176 will in progression become aligned with the axis of the shaft 32 and will move such shaft axially compressing the spring 40. The outer end of this shaft is provided with a ball-retaining recess in which is seated a ball 178 which rides on the eccentric surface 170 and frictionally rests in the ball seats 172, 174 and 176 to maintain the body 168 in the selected position.

The body 168 is provided with an O-ring seal and is held in place in the recess by a C-type washer or similar device. A handle 180 projecting laterally from such body provides the necessary leverage for easy rotation of the eccentric to the desired positions.

The rotary hammer thus described has a 5-way action. It will: (1) rotate the tool with heavy hammering; (2) rotate the tool with light hammering; (3) rotate the tool without hammering; (4) hammer the tool lightly without rotation; and (5) hammer the tool heavily without rotation. Its hammering parts such as the ram and impact block may be easily removed for repair or replacement. Its movable working parts are protected from abrasive foreign material. The operator is protected against sudden twists in the event of tool stickage. Finally, the tool may be easily inserted and held in place and when desired prevented from rotation by the simple application of an adapter.

Although but one embodiment of the present invention has been illustrated and described, it will be apparent to those skilled in the art that various changes and modifications may be made therein without departing from the spirit of the invention or from the scope of the appended claims.

I claim:
1. An electric tool for drilling, axial hammering, or drilling and hammering comprising:
    an electrically driven shaft having a pinion end;
    a rotatable cam shaft mounted for limited axial movement, a first intermediate gear fixed on said shaft and meshing with said pinion end to rotate said cam shaft, a cam carried by said gear for momentarily effecting displacement of a ram axially of said cam shaft upon rotation thereof, and a driving pinion end on said shaft;
    a clutch shaft, a second intermediate gear fixed thereon and meshing with said driving pinion end on said cam shaft, a clutch pinion rotatably carried on said clutch shaft, and a friction slip clutch between said second intermediate gear and said clutch pinion;
    a rotatable spindle, a gear on said spindle in driving engagement with said clutch pinion, said spindle having a ram-receiving bore and a tool shank-receiving bore;
    an axial movable and rotatable ram having a hammering head projecting into said ram-receiving bore, spring means for urging said ram toward said tool shank-receiving bore and flange on said ram to provide hammering action to a tool therein momentarily engaged by said cam to compress and then release said spring means; to provide a hammering action; and
    means for shifting said cam shaft axially toward and away from said flange to preset the amount of axial displacement of said ram upon each rotation of said cam.
2. A tool as defined in claim 1 in which:
    an impact block is positioned in said ram-receiving bore in front of said hammering head, and a spring urges said block away from said head.
3. A tool as defined in claim 2 in which:
    said impact block is provided with sealing rings cooperating with said ram-receiving bore to prevent abrasive material from passing from said tool shank-receiving bore through said ram-receiving bore.
4. A tool as defined in claim 1 in which:
    there is a second spring means acting on said ram in a direction opposite to said first spring means to buffer the hammering action of said ram.
5. A tool as defined in claim 1 in which:
    there is tool-retaining means adapted for detachably holding a tool with its shank in said tool shank-receiving bore.
6. A tool as defined in claim 5 in which:
    said tool-retaining means comprising a pair of spaced brackets extending along the axis of rotation of said spindle and a latch pivoted to one of said brackets and swingable in a plane transverse to said axis of rotation;
    said latch having a portion adapted to engage and hold a tool in place in said spindle.
7. A tool as defined in claim 6 in which:
    there is means to frictionally hold said latch in a plurality of positions.
8. A tool as defined in claim 6 in which:
    there is an adapter assembly non-rotatively carried between said bracket; and
    said adapter assembly having means adapted to engage a shank of a tool to prevent rotation thereof.
9. A retainer for the nose of a rotary hammer for retaining a tool element mounted in said rotary hammer comprising:

brackets attached to said nose and spaced on opposite sides of a tool mounted in said rotary hammer, said brackets having laterally extending flanges, openings in said flanges to receive fastening elements;

a pivotally mounted latch resting against said flanges having an opening aligned with an opening in one of said flanges through which a fastener passes to pivotally mount said latch, said latch having a finger at its free end by which it may be pivoted, said latch having a semi-circular notch opening to an edge thereof for engagement with a tool to prevent removal thereof;

a bearing plate resting against the outer side of said latch, said plate having openings aligned with said openings in said brackets and a central opening for receiving a tool shank;

spring-biased fasteners passing through said aligned openings to frictionally press said bearing plate and latch against said flanges; and interengaging means on said latch and plate to position said latch in tool retaining or tool receiving position.

10. A retainer as claimed in claim 9 which further includes an adapter for preventing rotation of the tool element comprising a flat-sided member fitted between said brackets to prevent rotation of said member relative to said brackets, said member having means for engagement with the tool element to prevent rotation thereof during hammer-like actuation thereof.

11. A retainer as claimed in claim 10 in which there is a resilient cushion-like collar interposed between said latch and said adapter to hold said adapter in tool-receiving position.

12. Shifting mechanism for the cam shaft and cam for cocking and releasing the spring-biased ram of rotary hammer comprising:

a rotating member having an axis of rotation perpendicular to the axis of rotation of the cam shaft, said member being positioned opposite an end of said shaft; and a cam surface on said member facing said end of said shaft, said surface having at least a low and high position for shifting said cam shaft axially from a noncocking to a cocking and releasing position upon rotation of said member.

13. Shifting mechanism as claimed in claim 12 in which:

a ball is carried in said end of said shaft and rolls on said cam surface;

said cam surface has a plurality of ball-receiving depressions for engaging said ball to frictionally lock said rotating member in selected position; and spring means urges said cam shaft toward said member.

14. A portable rotary hammer comprising:

a sectionalized housing having at least one section for enclosing gearing for transmitting rotary power to a tool-receiving spindle and a second section for enclosing a source of rotary power;

a source of rotary power mounted in said second section;

a tool-receiving spindle mounted in said first one section, said spindle having a bearing for slidably and rotatively receiving the end of a ram;

gear means carried in said first one section connectible with said source of rotary power to transmit rotation to said spindle;

a removable bearing carried by said second section and adapted to rotatably and slidable carry the other end of a ram; and a ram rotatable and slidably carried by said removable bearing and the bearing in said spindle whereby said removable bearing and ram may be removed when said sections are disconnected.

15. A portable rotary hammer as claimed in claim 14 in which:

said removable bearing is mounted in a plug threadedly secured in a carrier, said carrier having a stud removably connected to said second section.

16. A portable rotary hammer as claimed in claim 15 in which:

the inner end of said ram has a head in said carrier;

spring washers react between said head and said plug to buffer said ram in its impact action; and spring means reacts between said ram and said plug to provide upon compression and release thereof the impact action of said ram.

References Cited

UNITED STATES PATENTS

| 1,338,019 | 4/1920 | Jackson | 173—139 |
| 1,798,082 | 3/1931 | Grutzbach | 173—123 |
| 2,365,683 | 12/1944 | Curtis et al. | 308—39 |
| 2,794,621 | 6/1957 | Beeson | 173—109 |
| 2,826,093 | 3/1958 | Draper | 74—531 |
| 3,022,769 | 2/1962 | Amundsen et al. | 173—104 |
| 3,203,490 | 8/1965 | McCarty et al. | 173—109 |
| 3,270,821 | 9/1966 | Bassett et al. | 173—109 |

FRED C. MATTERN, JR., *Primary Examiner.*

L. P. KESSLER, *Assistant Examiner.*